United States Patent
Bae

(10) Patent No.: US 9,322,123 B2
(45) Date of Patent: Apr. 26, 2016

(54) LEVEL MEASURING DEVICE FOR A WALL MOUNTED DRUM TYPE WASHING MACHINE AND METHOD THEREOF

(71) Applicant: Dongbu Daewoo Electronics Corporation, Seoul (KR)

(72) Inventor: Sang Il Bae, Incheon (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 288 days.

(21) Appl. No.: 14/157,436

(22) Filed: Jan. 16, 2014

(65) Prior Publication Data

US 2015/0176188 A1 Jun. 25, 2015

(30) Foreign Application Priority Data

Dec. 20, 2013 (KR) .......................... 10-2013-0160358

(51) Int. Cl.
| | |
|---|---|
| *G01F 23/00* | (2006.01) |
| *G01F 23/28* | (2006.01) |
| *D06F 39/08* | (2006.01) |
| *D06F 37/26* | (2006.01) |
| *G01C 9/20* | (2006.01) |
| *G01F 23/14* | (2006.01) |
| *D06F 39/12* | (2006.01) |
| *D06F 33/02* | (2006.01) |

(52) U.S. Cl.
CPC ............ *D06F 39/087* (2013.01); *D06F 37/267* (2013.01); *G01C 9/20* (2013.01); *G01F 23/14* (2013.01); *D06F 33/02* (2013.01); *D06F 39/12* (2013.01); *D06F 2202/085* (2013.01); *D06F 2216/00* (2013.01)

(58) Field of Classification Search
None
See application file for complete search history.

(56) References Cited

U.S. PATENT DOCUMENTS 4,285,237 A * 8/1981 Romijn ................... E02D 13/06
73/300
4,982,606 A * 1/1991 Adamski ............... D06F 39/087
137/387

(Continued)

FOREIGN PATENT DOCUMENTS

| CA | 2393842 A1 | 2/2003 |
| EP | 0967318 A1 | 12/1999 |

(Continued)

OTHER PUBLICATIONS

Kim, Eung Ki; Leveling Device for Allowing a User to Check Level of a Structure From the Outside; Abstract of KR 10-2008-0022788; Mar. 12, 2008; http://kpa.kipris.or.kr.

*Primary Examiner* — Peter Macchiarolo
*Assistant Examiner* — Jermaine Jenkins

(57) ABSTRACT

A level measuring device for a wall mounted drum type washing machine and a level measuring method thereof, in which water levels of the left side and the right side of a tub of the wall mounted drum type washing machine are measured by first and second level measuring units, a control unit determines whether the washing machine is level from the measured water levels of the left and right sides of the tub, and a display unit displays a result of determining whether the washing machine is level, thereby reducing the installation time to install and level the washing machine, and allow a consumer to easily identify and maintain the level washing machine during use, thereby reducing vibrations and noise that occur during operation of the wall mounted drum type washing machine.

19 Claims, 4 Drawing Sheets

(56) References Cited

U.S. PATENT DOCUMENTS

| | | | | |
|---|---|---|---|---|
| 5,017,909 A | * | 5/1991 | Goekler | G01F 23/265 340/620 |
| 5,107,706 A | * | 4/1992 | Tolf | A47L 15/4244 134/113 |
| 6,223,595 B1 | * | 5/2001 | Dumbovic | G01F 23/24 340/612 |
| 8,342,029 B2 | * | 1/2013 | Gwan | A47L 15/421 73/706 |

| | | |
|---|---|---|
| 2010/0306927 A1 | 12/2010 | Oh et al. |

FOREIGN PATENT DOCUMENTS

| | | |
|---|---|---|
| EP | 2383383 A1 | 11/2011 |
| KR | 10-0213949 B1 | 8/1999 |
| KR | 10-2008-0022788 A | 3/2008 |
| KR | 10-2009-0018389 A | 2/2009 |

* cited by examiner

LEVEL MEASURING DEVICE FOR A WALL MOUNTED DRUM TYPE WASHING MACHINE AND METHOD THEREOF

CROSS-REFERENCE TO RELATED APPLICATIONS

This application is based on and claims priority from Korean Patent Application No. 10-2013-0160358, filed on Dec. 20, 2013, the disclosure of which is incorporated herein in its entirety by reference.

TECHNICAL FIELD

The present disclosure relates to a level measuring device of a wall mounted drum type washing machine and a method of measuring a water level in a wall mounted drum type washing machine, and more particularly, to a level measuring device for a wall mounted drum type washing machine and a water level measuring method, in which left and right water levels of the water in a tub of the washing machine are measured by first and second level measuring units, a control unit configured to determine whether the washing machine is level by the measured left and right water levels of the tub, and a display unit configured to display a result indicating whether the washing machine is level, thereby reducing the time to accurately mount or install the wall mounted drum type washing machine and/or reduce vibrations and noise that occur during the operation of the wall mounted drum type washing machine.

BACKGROUND

A washing machine is an apparatus that performs a washing cycle, a rinsing cycle, and a spin-drying cycle using a driving force of a motor to wash the laundry.

Generally, the washing machine may be classified into a pulsator type washing machine (e.g., a fully automatic washing machine), a drum type washing machine, an agitator type washing machine, and the like depending on a washing type.

Today, since the amount of laundry is reduced with the trend toward a more energy conservative family, demand for smaller washing machines have increased. To meet the demand and minimize the space where the washing machine is mounted, a wall mounted drum type washing machine has been developed.

Generally, the wall mounted drum type washing machine refers to a drum type washing machine that has a small laundry capacity and is configured to be used in a relatively narrow space (e.g., mounted or installed on a wall surface).

FIG. 1 is a perspective view illustrating a wall mounted drum type washing machine 1 according to the related art. A tub 2 is filled with water supplied by a water supply unit (not illustrated).

A case or housing 4 forms an outer surface of the wall mounted drum type washing machine.

A cylindrical drum 3 rotates in the tub 2 and below or behind the case or housing 4 by rotating power from a motor (not illustrated).

A front surface of the case or housing 4 has a door 5. In this configuration, a user may put the laundry into the drum 43 by opening the door 5.

An operation part (e.g., a control unit and/or interface) 6 is mounted or installed below the door. The washing cycle, the rinsing cycle, and the spin-drying cycle are selectively or sequentially performed by the user's operation of the operation part 6.

The wall mounted drum type washing machine 1 is operated by opening the door 5, placing the laundry into the drum 3, closing the door 5, and operating the operation part 6 after application of power.

When the wall mounted drum type washing machine 1 is operated, water is introduced into the tub 2 when a water supply valve is opened and then the water flows into the tub 2 and then into the drum 3. When the water in the drum 3 is above a predetermined water level, the motor is operated by a microcomputer and transfers the rotating power to the drum 3. The laundry in the drum 3 is washed by rotating the drum 3.

Generally, since the wall mounted drum type washing machine is mounted on a wall surface, there is a need to minimize vibrations and noise, and mount the wall mounted drum type washing machine at an accurate level to properly set and maintain accurate water levels for operation of the washing machine.

When the wall mounted drum type washing machine according to the related art is mounted on the wall, the installer mounts and levels the wall mounted drum type washing machine with the naked eye and/or external equipment. Thus, the wall mounted drum type washing machine may not be mounted at an accurate level, and a considerable amount of time and effort may be required to establish and maintain the accurate level.

When the wall mounted drum type washing machine according to the related art, is mounted on the wall, an installer may be required to carry a separate level measuring device.

Even when the wall mounted drum type washing machine according to the related art is accurately mounted, the wall mounted drum type washing machine may become unbalanced or not level over time.

When the accurate level is lost during the use of the wall mounted drum type washing machine, it may become difficult and/or impossible for a user to maintain or readjust the washing machine to the accurate level, causing vibrations and/or noise to increase, and the water level to not be accurately sensed, thereby causing the malfunction of the wall mounted drum type washing machine.

A conventional wall mounted drum type washing machine may be disclosed in Korean Patent Application Laid-Open No. 10-2008-0022788.

SUMMARY

The present disclosure has been made in an effort to provide a level measuring device of a wall mounted drum type washing machine and a level measuring method thereof, in which a left water level and a right water level of the water in a tub of the washing machine are measured by a first level measuring unit and a second level measuring unit, a control unit determines whether the washing machine is level from the measured left water level and right water level of the tub, and a display unit displays a result indicating whether the washing machine is level, thereby reducing the time to accurately mount or install the wall mounted drum type washing machine and allowing a user to easily identify whether the washing machine is level, thereby reducing vibrations and noise that occur during the operation of the wall mounted drum type washing machine.

Exemplary embodiments of the present disclosure provide a level measuring device for a wall mounted drum type washing machine, including a tub, a case or housing, and a drum in the tub, the level measuring device comprising: a first level measuring unit at a first (e.g., left) side of the washing machine, between the tub and the case or housing; a second level measuring unit at a second (e.g., right) side of the washing machine between the tub and the case or housing; and a control unit configured to determine whether the washing machine is level from the first level measuring unit and the second level measuring unit (e.g., from information or signals received from the first and second level measuring units).

The level measuring device for the wall mounted drum type washing machine may further include a display unit configured to display whether the washing machine is level.

The first level measuring unit may include a first water level sensor configured to measure a water level of the first (e.g., left) side of the tub; and a first hose having one end connected to a first (e.g., lower left) side of the tub and another end connected to the first water level sensor.

The second level measuring unit may include a second water level sensor configured to measure a water level of the second (e.g., right) side of the tub; and a second hose having one end connected to a second (e.g., lower right) side of the tub and another end connected to the second water level sensor.

The control unit may include a signal receiving unit configured to receive signals from the first water level sensor and the second water level sensor; and a level determination unit configured to determine whether the washing machine is level by comparing the water level on the first (e.g., left) side and the water level on the second (e.g., right) side of the tub, respectively, based on the signals received by the signal receiving unit.

The control unit may further include a level measurement result transmission unit configured to transmit a result of the level determination unit to the display unit.

Other exemplary embodiments of the present disclosure provide a method of measuring a water level in (or determining a balance or level accuracy of) a wall mounted drum type washing machine, including filling a tub with water from a water supply unit; measuring a water level of a first side of the tub using a first water level sensor; measuring a water level of a second side of the tub using a second water level sensor; and determining whether the washing machine is level from signals representing the water levels of the first and second sides of the tub transmitted by the first water level sensor and the second water level sensor, respectively.

The method may further include displaying a result on a display unit subsequent to determining whether the washing machine is level.

According to exemplary embodiments of the present disclosure, it may be possible to reduce the installation time and effort, and maintain the level or balance of the washing machine.

According to exemplary embodiments of the present disclosure, it may be possible for the user to easily identify whether the washing machine is level and to easily adjust an imbalanced washing machine.

According to exemplary embodiments of the present disclosure, it may be possible to reduce vibrations or noise occurring during operation of the wall mounted drum type washing machine and remarkably reduce the occurrence of malfunctions by easily identifying whether the washing machine is level when first installed and/or during the use thereof and maintaining a level washing machine.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
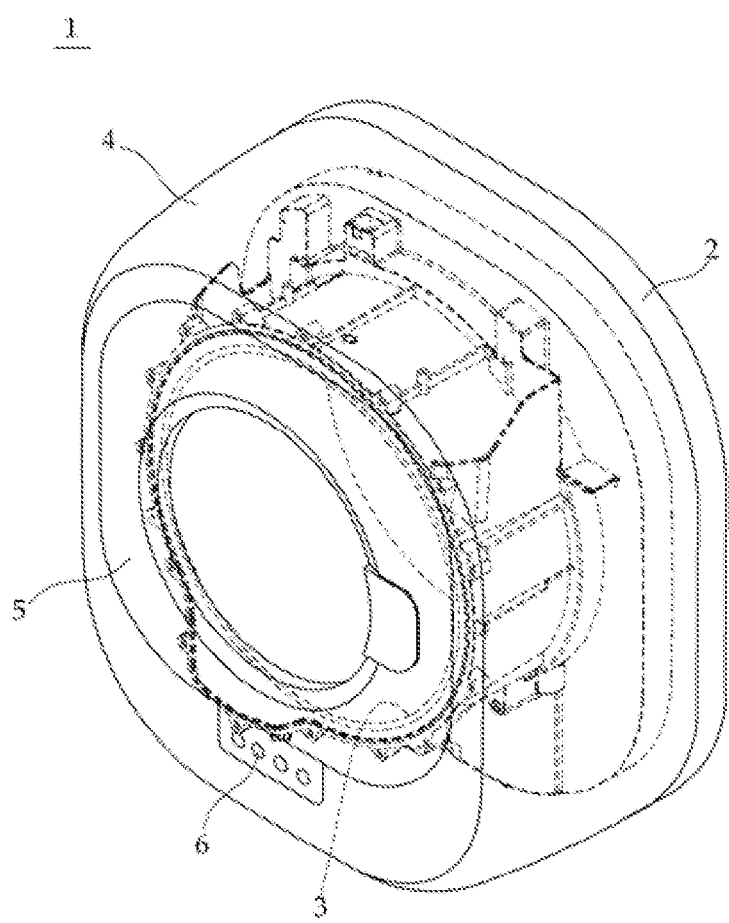
FIG. 1 is a perspective view of a wall mounted drum type washing machine according to the related art.

In the following detailed description, reference is made to the accompanying drawings, which forms a part hereof. The illustrative embodiments described in the detailed description, drawings, and claims are not meant to be limiting. Other embodiments may be utilized, and other changes may be made, without departing from the spirit or scope of the subject matter presented here.

Exemplary embodiments of the present disclosure will be described in detail with reference to the accompanying drawings. In adding reference numerals to components of each drawing, like components are denoted by like reference numerals.

Figure 2:
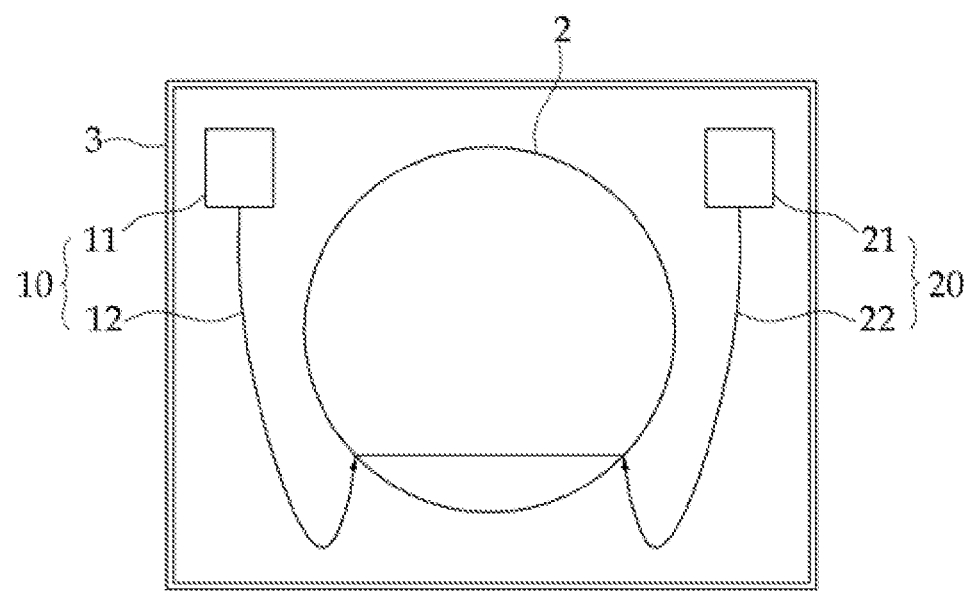
FIG. 2 is a diagram of a first level measuring unit and a second level measuring unit of a level measuring device of a wall mounted drum type washing machine according to exemplary embodiments of the present disclosure.
Figure 3:
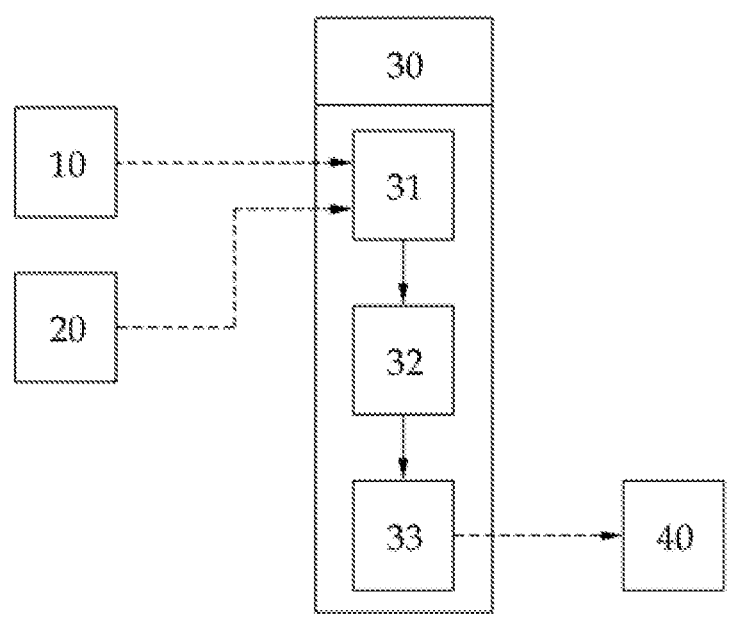
FIG. 3 is a block diagram of the level measuring device of the wall mounted drum type washing machine according to exemplary embodiments of the present disclosure.

FIG. 2 is a diagram of a first level measuring unit 10 and a second level measuring unit 20 of a level measuring device of a wall mounted drum type washing machine according to exemplary embodiments of the present disclosure. FIG. 3 is a block diagram of a level measuring device 100 for a wall mounted drum type washing machine according to the exemplary embodiments of the present disclosure.

A level measuring device 100 for a wall mounted drum type washing machine according to the exemplary embodiments of the present disclosure will be described with reference to FIGS. 2 and 3. The level measuring device 100 includes the first level measuring unit 10, the second level measuring unit 20, and a control unit 30.

FIG. 1 is a perspective view illustrating a wall mounted drum type washing machine 1 according to the related art. A tub 2 is partially filled with water that is supplied by a water supply unit (not illustrated).

A case or housing 4 forms an outer surface of the wall mounted drum type washing machine 1.

A cylindrical drum 3 is between the tub 2 and the case or housing 4, and rotates in the case or housing 3 by receiving rotating power from a motor (not illustrated).

A front surface of the case or housing 4 has a door 5. In this configuration, a user may place laundry into the drum 3 by opening the door 5.

An operation part 6 is mounted or installed below the door 5. The washing cycle, the rinsing cycle, and the spin-drying cycle are selectively or sequentially performed by the user operating the operation part 6.

The wall mounted drum type washing machine 1 is operated by opening the door 5, placing the laundry into the drum 3, closing the door 5, and operating the operation part 6 after application of power.

When the wall mounted drum type washing machine 1 is operated, water is introduced into the tub 2 when a water supply valve is opened, and then the water in the tub 2 flows into the drum 3. When the water is above a predetermined water level in the drum 3, the motor is operated by a microcomputer and transfers the rotating power to the drum 3. The laundry in the drum 4 is washed by rotating the drum 3 using the motor.

The first level measuring unit 10 is mounted at least in part at the left side of the washing machine, between the tub 2 and the case or housing 3, including on an outer surface of the tub 2 on an inner surface of the housing 3. The second level measuring unit 20 is mounted at least in part at the right side of the washing machine, between the tub 2 and the case or housing 3, including on an outer surface of the tub 2 on an inner surface of the housing 3.

Referring to FIG. 2, the control unit 30 is in or electrically connected to the operation part (or control unit) 6 and is configured to determine whether the wall mounted drum type washing machine is level from the first level measuring unit 10 and the second level measuring unit 20 (e.g., by receiving and processing information or signals from the first and second level measuring units 10 and 20).

Referring to FIG. 3, the level measuring device 100 of the wall mounted drum type washing machine according to further exemplary embodiments of the present disclosure includes a display unit 40. The display unit 40 is installed or mounted in the operation part 6 and is configured to display a level or balance state of the wall mounted drum type washing machine. Although not necessarily limited thereto, according to the exemplary embodiments of the present disclosure, the display unit 40 may comprise an LCD panel and may display whether the wall mounted drum type washing machine is level or balanced in various forms (e.g., one or more numbers, letters, graphs, combinations thereof, etc.).

For example, when the water level measured by the first level measuring unit 10 is greater than that measured by the second level measuring unit 20, this determination and/or result may be represented in the form of a graph showing an increase toward the left from a reference point on the display unit 40. For example, when the water level on the left side is higher, a value L1 or L2 representing the water level on the left side of the washing machine may be displayed on the left side of the graph, and the other value (e.g., L2 or L1) may represent the water level on the left side of the washing machine when it is not higher than the right side of the washing machine. Similarly, when the water level on the right side of the washing machine is higher, a value R1 or R2 representing the water level on the right side of the washing machine may be displayed on the right side of the graph, and the other value (e.g., R2 or R1) may represent the water level on the right side of the washing machine when it is not higher than the left side of the washing machine. If L1=R1 and L2=R2, then the graph will show the manner in which the washing machine is imbalanced or is not level (e.g., either the left side or the right side has a higher water level, and is thus lower than the other side). The present embodiments are not limited to determining an imbalance between the left and right sides of the washing machine; some embodiments may determine an imbalance between the front and rear sides of the washing machine, which can determine if the washing machine is mounted or installed properly against the wall, or if the washing machine is pulling away or becoming dislodged from the wall.

As illustrated in FIGS. 2 and 3, the first level measuring unit 10 of the level measuring device 100 includes a first water level sensor 11 and a first hose 12.

The first water level sensor 11 is at or in an upper left part or quadrant of the washing machine, between the tub 2 and the case or housing 4. The first water level sensor 11 measures the water level on the left side of the tub 2.

One end of the first hose 12 is connected to a location in the lower left quadrant of the tub 2, and another end (e.g., the opposite end) of the first hose 12 is connected to the first water level sensor 11. Thus, the first water level sensor 11 measures or determines the water level on the left side of the tub 2 from the pressure in the first hose 12 sensed by the first water level sensor 11.

As illustrated in FIGS. 2 and 3, the second level measuring unit 20 of the level measuring device includes a second water level sensor 21 and a second hose 22.

The second water level sensor 21 is at or in an upper right part or quadrant of the washing machine, between the tub 2 and the case or housing 3. The second water level sensor 21 measures a water level on the right side of the tub 22.

One end of the second hose 22 is connected to a location in the lower right quadrant of the tub 2, and another end (e.g., the opposite end) of the second hose 22 is connected to the second water level sensor 21. Thus, the second water level sensor 21 measures the water level on the right side of the tub 2 from the pressure in the second hose 22 sensed by the second water level sensor 21. Although the first and second hoses 12 and 22 can be connected almost anywhere along the lower quadrants of the tub 2, they are typically connected at a location from 15° to 60° from the lowermost point along the outer surface of the tub 2 (or relative to a vertical line bisecting the tub 2 into left and right sides).

As illustrated in FIG. 3, the control unit 30 of the level measuring device 100 includes a signal receiving unit 31 and a level determination unit 32. According to further exemplary embodiments of the present disclosure, the control unit 30 further includes a level measurement result transmission unit 33.

The signal receiving unit 31 is in the control unit 30 and receives signals from the first water level sensor 11 and the second water level sensor 21 that represent the water levels on the first and second sides of the washing machine, respectively.

The level determination unit 32 compares the water level on the left and right sides of the tub 2 that are measured by the first water level sensor 11 and the second water level sensor 21, respectively. Based on the signals received from the and second water level sensors 11 and 21, the signal receiving unit 31 determines whether the wall mounted drum type washing machine is level (e.g., in a level state).

The level measurement result transmission unit 33 transmits the determination and/or result from the level determination unit 32 to the display unit 40, and the display unit 40 displays a message based on the signal transmitted from the level measurement result transmission unit 33, allowing an installer or a consumer to identify whether the washing machine is level.

Figure 4:
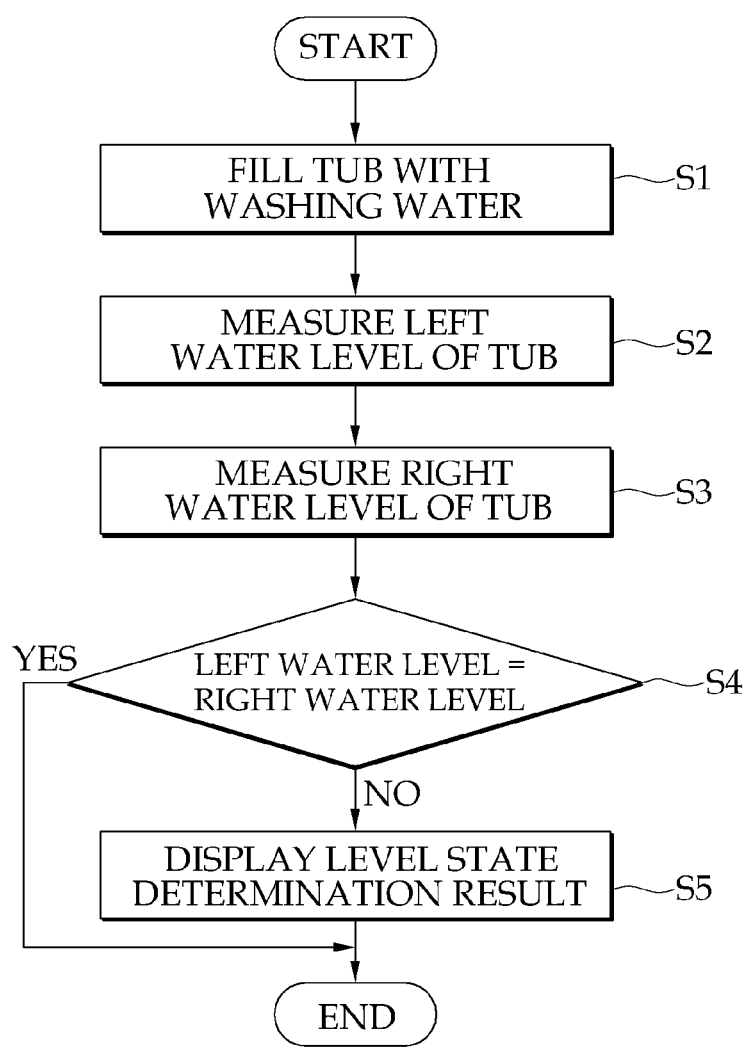
FIG. 4 is a flow chart of a method of measuring or determining a level or balance of a wall mounted drum type washing machine according to exemplary embodiments of the present disclosure.

FIG. 4 is a flow chart of a level measuring method for the wall mounted drum type washing machine according to exemplary embodiments of the present disclosure. A level measuring method for the wall mounted drum type washing machine according to exemplary embodiments of the present disclosure will be described with reference to FIG. 4. The level measuring method of the present disclosure includes filling the tub at least partially with water (S1), measuring the water level of the left side of the tub (S2), measuring the water level of the right side of the tub (S3), and determining whether the washing machine is level or in a level state (S4). The level measuring method of the exemplary embodiments of the present disclosure further include displaying a result (e.g., determination result) indicating whether the wall mounted drum type washing machine is level (S5).

Although not illustrated in FIG. 4, the water is added to the tub 2 by the water supply unit. The amount of water added to the tub 2 is controlled by the user using the control unit 6 (e.g., an amount of water for a small, medium or large load of laundry).

After adding the water to the tub (S1), the water level of the left side of the tub 2 is measured by the first water level sensor 11 of the first level measuring unit 10, and the measured water level on the left side of the tub is transmitted to the signal receiving unit 31 of the control unit 30.

After measuring the water level of the left side of the tub (S2), the water level of the right side of the tub 2 is measured by the second water level sensor 21 of the second level measuring unit 20, and the measured water level on the right side is transmitted to the signal receiving unit 31 of the control unit 30. However, in practice, there is no preference for measuring one side before the other, or transmitting one signal before the other. In fact, both sides may be measured substantially simultaneously, and both signals may be transmitted substantially simultaneously.

After measuring of the water levels on both sides of the tub (S3), the level determination unit 32 of the control unit 30 uses the signals transmitted to the signal receiving unit 31 of the control unit 30 to determine whether the washing machine is level, based on the water level values of the left and right sides of the tub 2 measured by the first water level sensor 11 and the second water level sensor 21, respectively.

After determining whether the wall mounted drum type washing machine is level (S4), the result is displayed on the display unit 40.

Therefore, the installer or the user may determine whether the wall mounted drum type washing machine is level, and/or readily correct or level the washing machine depending on the result displayed on the display unit. Thus, it may be possible to minimize vibrations and/or noise occurring during the operation of the wall mounted drum type washing machine by accurately leveling the wall mounted drum type washing machine at the time of installation and/or during the use thereof.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A level measuring device for a wall mounted drum type washing machine including a tub, a case or housing, and a drum between the tub and the case or housing, the level measuring device comprising:
   a first level measuring unit at a first side of the washing machine, between the tub and the case or housing;
   a second level measuring unit at a second side of the washing machine, between the tub and the case or housing; and
   a control unit configured to determine whether the washing machine is level from the first level measuring unit and the second level measuring unit.

2. The level measuring device of claim 1, further comprising:
   a display unit configured to display whether the washing machine is level.

3. The level measuring device of claim 2, wherein the first level measuring unit comprises:
   a first water level sensor configured to measure a water level of the first side of the tub; and
   a first hose having one end connected to the first side of the tub and another end connected to the first water level sensor.

4. The level measuring device of claim 3, wherein the second level measuring unit comprises:
   a second water level sensor configured to measure a water level of the second side of the tub; and
   a second hose having one end connected to the second side of the tub and another end connected to the second water level sensor.

5. The level measuring device of claim 4, wherein the control unit comprises:
   a signal receiving unit configured to receive signals from the first water level sensor and the second water level sensor; and
   a level determination unit configured to determine whether the washing machine is level by comparing the water level on the first side and the water level on the second side of the tub, respectively, based on the signals received by the signal receiving unit.

6. The level measuring device of claim 5, wherein the control unit comprises a level measurement result transmission unit configured to transmit a result of the level determination unit to the display unit.

7. The level measuring device of claim 2, wherein the display unit comprises an LCD panel.

8. The level measuring device of claim 7, wherein the LCD panel is configured to display numbers, letters, graphs, or a combination thereof.

9. The level measuring device of claim 8, wherein the LCD panel displays a graph indicating whether the water level on the first side is higher, the water level on the second side is higher, or that the washing machine is level.

10. The level measuring device of claim 4, wherein the first water level sensor is at an upper left portion of the washing machine and measures the water level of the left side of the tub through the first hose, and the second water level sensor is at an upper right portion of the washing machine and measures the water level of the right side of the tub through the second hose.

11. A method of measuring a water level in a wall mounted drum type washing machine, comprising:
   filling a tub with water from a water supply unit;
   measuring a water level of a first side of the tub using a first water level sensor;
   measuring a water level of a second side of the tub using a second water level sensor; and
   determining whether the washing machine is level using signals representing the water levels of the first and second sides of the tub transmitted by the first water level sensor and the second water level sensor, respectively.

12. The method of claim 11, further comprising:
   after determining whether the washing machine is level, displaying a level determination result on a display unit.

13. The method of claim 12, wherein displaying the level determination result comprises displaying one or more numbers, letter, graphs or combinations thereof on the display unit.

14. The method of claim 13, wherein displaying the level determination result comprises displaying the graph.

15. The method of claim 14, wherein the graph indicates that the water level on the first side is higher, the water level on the second side is higher, or that the washing machine is level.

16. The level measuring method of claim 11, wherein measuring the water level on the first side of the tub comprises sensing a pressure through a first hose, and measuring the water level on the second side of the tub comprises sensing a pressure though a second hose.

17. The level measuring method of claim 11, wherein the first side of the tub is a left side, and the second side of the tub is a right side.

18. The method of claim 11, further comprising receiving the signals from the first and second water level sensors in a control unit.

19. The level measuring method of claim 18, wherein the control unit determines whether the washing machine is level.

* * * * *